United States Patent
Kamada et al.

(10) Patent No.: US 11,763,445 B2
(45) Date of Patent: Sep. 19, 2023

(54) INSPECTION OF A TARGET OBJECT USING A COMPARISON WITH A MASTER IMAGE AND A STRICTNESS OF A QUALITY EVALUATION THRESHOLD VALUE

(71) Applicants: Takuji Kamada, Kanagawa (JP); Keiji Kojima, Kanagawa (JP); Yoichi Kubota, Tokyo (JP); Yuka Minamizono, Bellevue, WA (US)

(72) Inventors: Takuji Kamada, Kanagawa (JP); Keiji Kojima, Kanagawa (JP); Yoichi Kubota, Tokyo (JP); Yuka Minamizono, Bellevue, WA (US)

(73) Assignee: RICOH COMPANY, LTD., Tokyo (JP)

( * ) Notice: Subject to any disclaimer, the term of this patent is extended or adjusted under 35 U.S.C. 154(b) by 75 days.

(21) Appl. No.: 17/130,001

(22) Filed: Dec. 22, 2020

(65) Prior Publication Data
US 2021/0209740 A1    Jul. 8, 2021

(30) Foreign Application Priority Data

Jan. 6, 2020    (JP) .................................. 2020-000551

(51) Int. Cl.
*G06T 7/00*    (2017.01)

(52) U.S. Cl.
CPC .... *G06T 7/001* (2013.01); *G06T 2207/30144* (2013.01)

(58) Field of Classification Search
CPC ........... G06T 7/001; G06T 2207/30144; G06T 2207/10152; G06T 2207/20221
See application file for complete search history.

(56) References Cited

U.S. PATENT DOCUMENTS

| | | | |
|---|---|---|---|
| 6,088,470 A | 7/2000 | Camus et al. | |
| 2003/0228045 A1* | 12/2003 | Asai | G06T 7/001 |
| | | | 382/141 |

(Continued)

FOREIGN PATENT DOCUMENTS

| | | |
|---|---|---|
| EP | 2452819 A1 | 5/2012 |
| JP | 2002-501265 | 1/2002 |

(Continued)

OTHER PUBLICATIONS

U.S. Appl. No. 16/986,836, filed Aug. 6, 2020, Fumihiro Nakashige, et al.
Extended European Search Report dated May 12, 2021.

*Primary Examiner* — Christopher Wait
(74) *Attorney, Agent, or Firm* — Harness, Dickey & Pierce, P.L.C.

(57) ABSTRACT

An inspection system includes circuitry configured to determine whether a predetermined pattern is present in a master image of an inspection target object; acquire an inspection target image of the inspection target object from an image captured by an image capturing device; compare the master image of the inspection target object with the inspection target image, to inspect the inspection target object; and switch a threshold value used in comparing the master image with the inspection target image of the inspection target object depending on a determination result of determining whether the predetermined pattern is present in the master image of the inspection target object.

20 Claims, 19 Drawing Sheets

(56) References Cited

U.S. PATENT DOCUMENTS

| | | |
|---|---|---|
| 2005/0280849 A1 | 12/2005 | Kojima et al. |
| 2012/0113443 A1 | 5/2012 | Itoh et al. |
| 2012/0121139 A1* | 5/2012 | Kojima ............... B41F 33/0036 |
| | | 382/112 |
| 2013/0063723 A1 | 3/2013 | Shimbo et al. |
| 2013/0250319 A1 | 9/2013 | Kaneko et al. |
| 2013/0250369 A1 | 9/2013 | Kitai et al. |
| 2014/0270396 A1 | 9/2014 | Miyagawa et al. |
| 2014/0314281 A1 | 10/2014 | Kojima et al. |
| 2015/0125078 A1* | 5/2015 | Kitagawa ................ G06T 5/003 |
| | | 382/173 |
| 2017/0109604 A1* | 4/2017 | Graham ................ G06V 10/24 |
| 2017/0270359 A1 | 9/2017 | Ouchi et al. |
| 2017/0272613 A1 | 9/2017 | Kamada et al. |
| 2018/0211106 A1 | 7/2018 | Kamada et al. |
| 2019/0149695 A1* | 5/2019 | Kamada ............... G06V 30/413 |
| | | 358/471 |
| 2019/0216437 A1* | 7/2019 | Yamada ............. G01S 7/52074 |

FOREIGN PATENT DOCUMENTS

| | | |
|---|---|---|
| JP | 2014-198465 | 10/2014 |
| JP | 2018-023484 | 2/2018 |

\* cited by examiner

FIG. 13
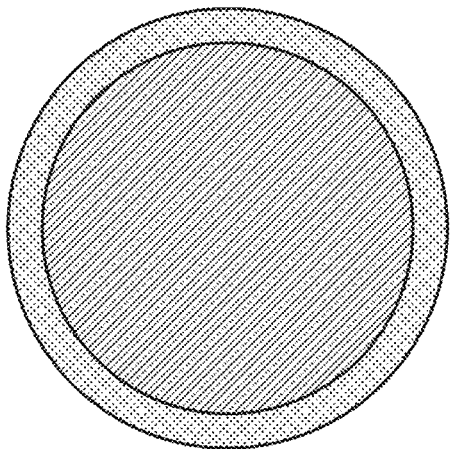
Type 1: Circle
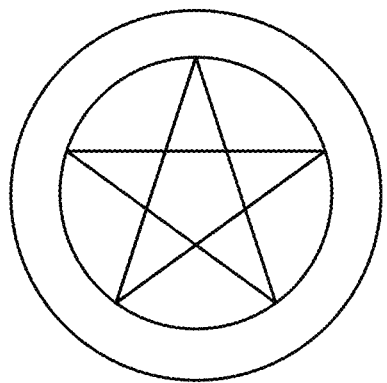
Type 2: Circle & Picture
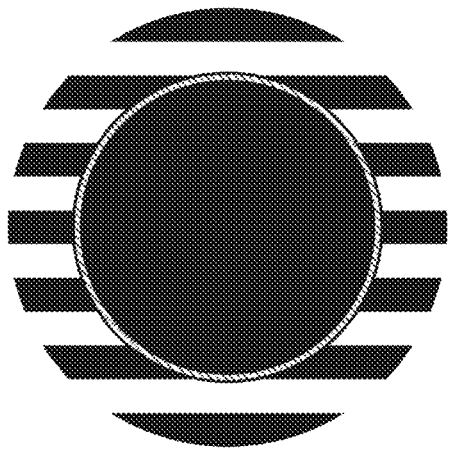
Type 3: Circle in Picture
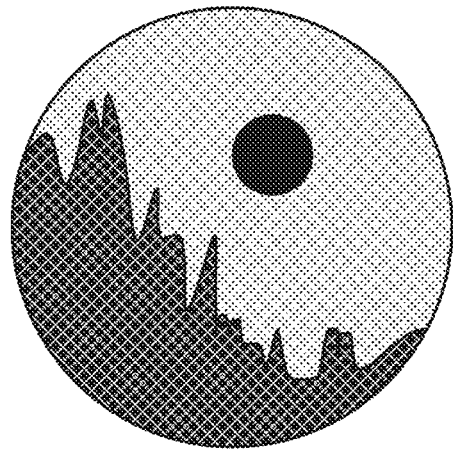
Type 0: Normal
Patterns Other than
Type 1 to Type 3

| TYPE | THE NUMBER OF COLORS OF OUTER PERIPHERY COLOR | DOMINANT COLOR OF INNER PERIPHERY COLOR |
|---|---|---|
| 1 | 1 | DIFFERENT COLOR FROM OUTER PERIPHERY COLOR |
| 2 | 1 | SAME COLOR AS OUTER PERIPHERY COLOR |
| 3 | PLURAL | DON'T CARE |

| TYPE | COEFFICIENT CTYPE |
|---|---|
| 0 | 1.0 |
| 1 | 0.5 |
| 2 | 0.7 |
| 3 | 0.8 |

INSPECTION OF A TARGET OBJECT USING A COMPARISON WITH A MASTER IMAGE AND A STRICTNESS OF A QUALITY EVALUATION THRESHOLD VALUE

CROSS-REFERENCE TO RELATED APPLICATION

This patent application is based on and claims priority under 35 U.S.C. § 119(a) to Japanese Patent Application No. 2020-000551, filed on Jan. 6, 2020 in the Japan Patent Office, the entire disclosure of which is incorporated herein by reference.

BACKGROUND

Technical Field

The present disclosure relates to an inspection system, an information processing apparatus, and a non-transitory computer-readable medium.

Description of the Related Art

Inspection apparatuses are known that inspect objects by illuminating the objects and capturing images of the objects using an imaging camera.

For example, a technique is known of identifying an object in an image by using an image captured by an imaging camera.

In recent years, three-dimensional objects are sometimes inspected as inspection target objects. For example, various designs are printed on the faces of the three-dimensional object according to user's tastes. Visual inspection by an inspector is known for inspecting the print quality of a design image on such a three-dimensional object.

SUMMARY

According to one or more embodiments, an inspection system includes circuitry configured to: determine whether a predetermined pattern is present in a master image of an inspection target object; acquire an inspection target image of the inspection target object from an image captured by an image capturing device; compare the master image of the inspection target object with the inspection target image, to inspect the inspection target object; and switch a threshold value used in comparing the master image with the inspection target image of the inspection target object depending on a determination result of determining whether the predetermined pattern is present in the master image of the inspection target object.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 13 is a diagram illustrating examples of types of a picture, according to an embodiment of the present disclosure;

Figure 1:
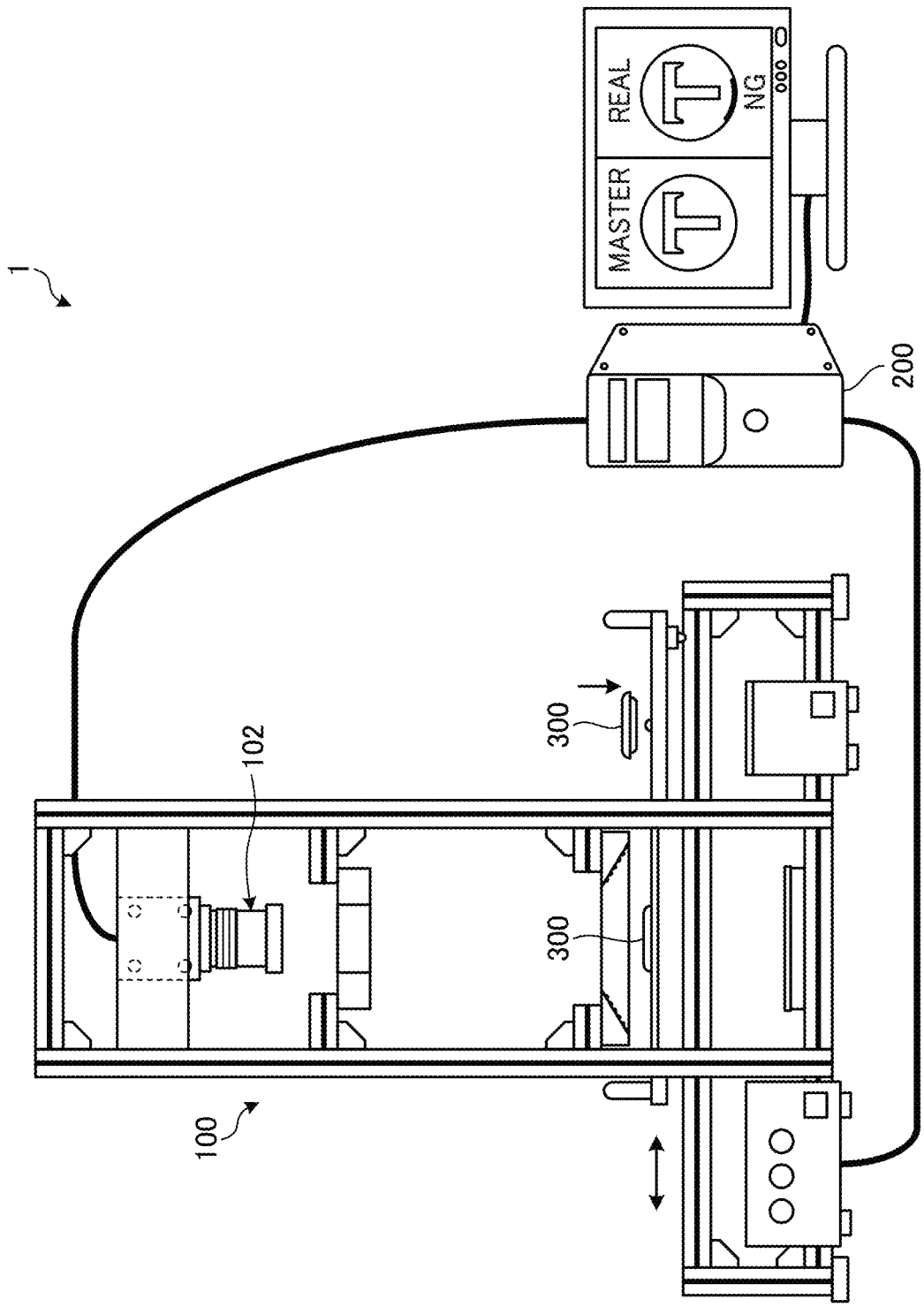
FIG. 1 is a diagram illustrating a configuration of an inspection system, according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of an inspection system, an information processing apparatus and a non-transitory computer-readable medium are described in detail with reference to the drawings.

First Embodiment

FIG. 1 is a diagram illustrating a configuration of an inspection system 1, according to the first embodiment. As illustrated in FIG. 1, the inspection system 1 includes an inspection apparatus 100, and an information processing apparatus 200. Examples of the information processing apparatus 200 include, but are not limited to, a personal computer (PC) and a server. The information processing apparatus 200 controls the inspection apparatus 100.

The inspection apparatus 100 illuminates an inspection target object 300, which is an object to be inspected, and inspects the inspection target object 300 using an image capturing device 102.

Figure 2:
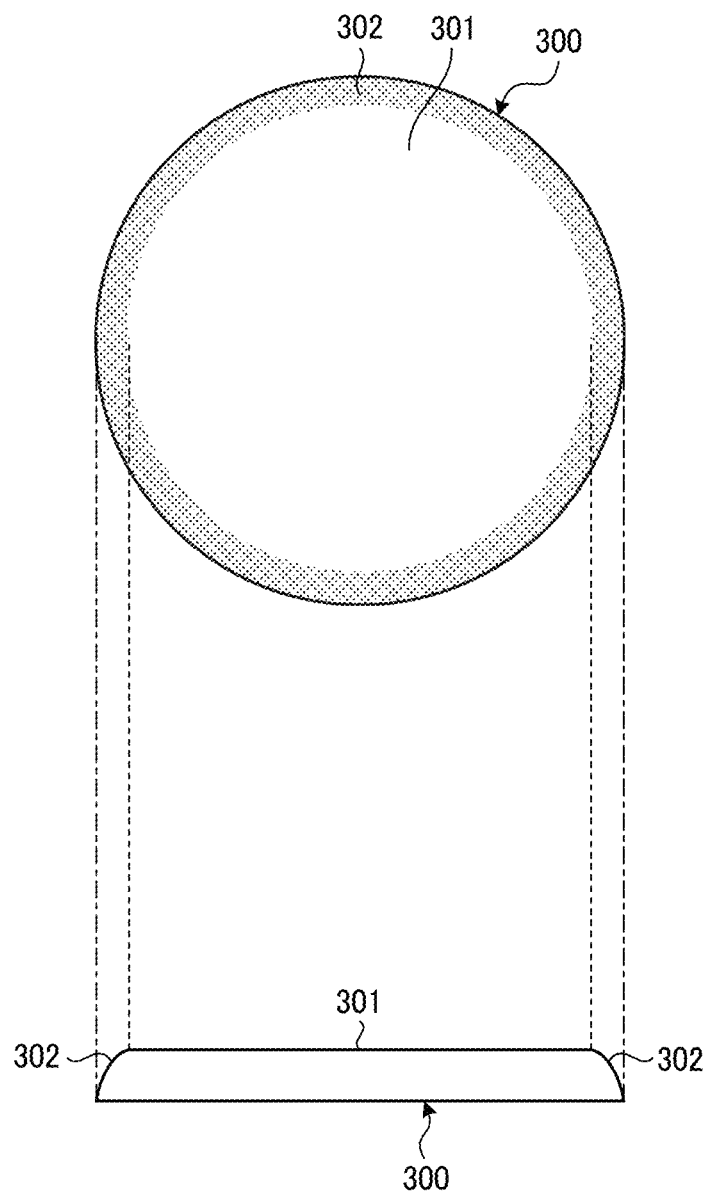
FIG. 2 is a diagram illustrating an example of an inspection target object, according to an embodiment of the present disclosure.

FIG. 2 is a diagram illustrating an example of the inspection target object 300. As illustrated in FIG. 2, the inspection target object 300 of the present embodiment has a three-dimensional disk shape having a given thickness. The inspection target object 300 includes a flat face area 301 having a flat shape, and an edge face area 302 that is curved from the flat face area 301. The flat face area 301 is embossed.

A surface of the inspection target object 300 is printed with various designs according to user preferences using printing apparatuses, such as ink jet printer. The inspection apparatus 100 checks the printing quality of a design image printed on the inspection target object 300.

Note that the disk shape is one example of the shape of the inspection target object 300. In another example, the inspection target object 300 has an any suitable shape, such as a rectangular shape. Examples of the inspection target object 300 include, but are not limited to, a can badge, a smartphone cover for covering a smartphone, and a drop prevention grip to be attached to a smartphone.

Figure 3:
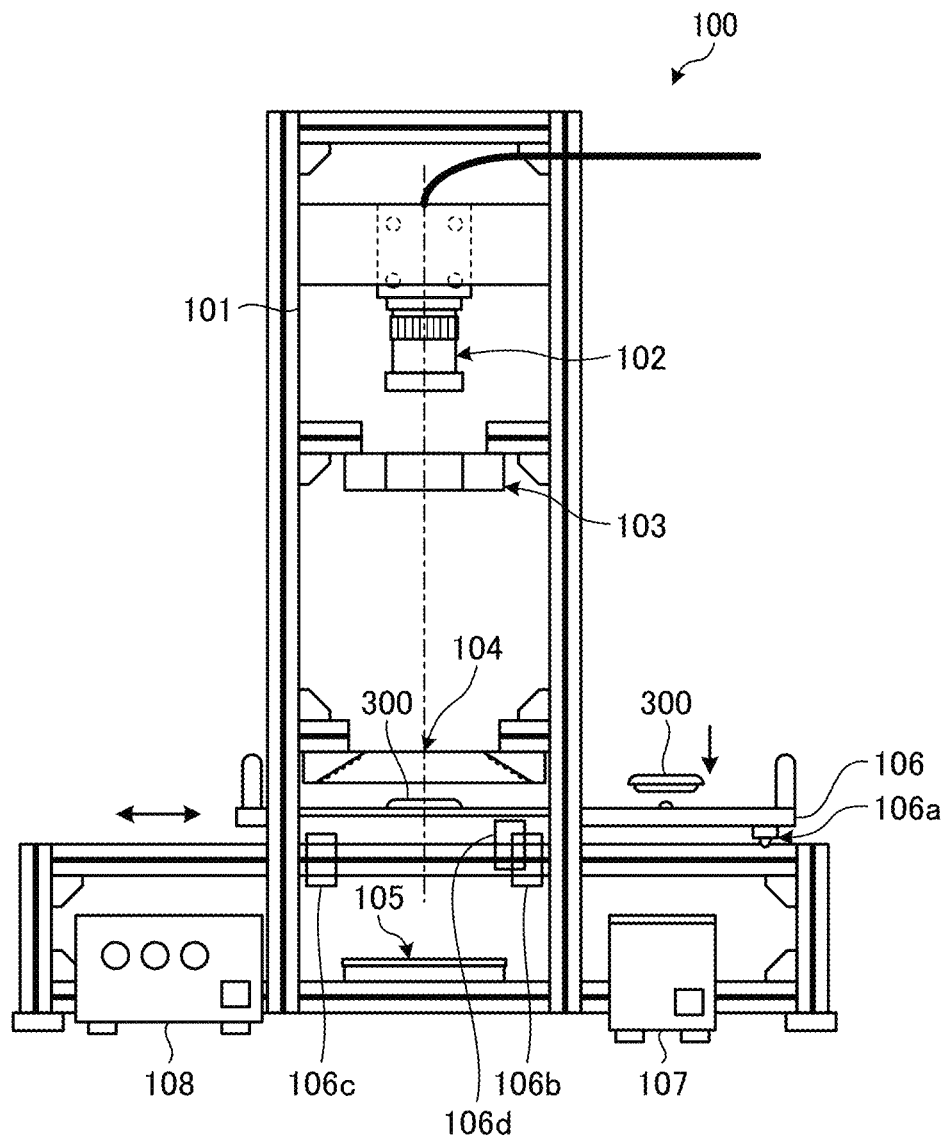
FIG. 3 is a diagram illustrating a configuration of an inspection apparatus, according to an embodiment of the present disclosure.

FIG. 3 is a diagram illustrating a configuration of the inspection apparatus 100. As illustrated in FIG. 3, the inspection apparatus 100 includes a main frame 101 made of an aluminum frame. The main frame 101 is formed in a square-column shape.

The main frame 101 includes an image capturing device 102, a first encircled lighting device 103, which is a first lighting device, a second encircled lighting device 104, which is a second lighting device, and a backlight lighting device 105, which is a third lighting device, vertically arranged in this order from the upper side of the vertical direction.

The main frame 101 further includes a slide stage 106 between the second encircled lighting device 104 and the backlight lighting device 105.

The image capturing device 102 is, for example, a camera using a complementary metal oxide semiconductor (CMOS), and outputs signals corresponding to projected light. In another example, a camera using a charge coupled device (CCD) is applicable as the image capturing device 102.

Figure 4:
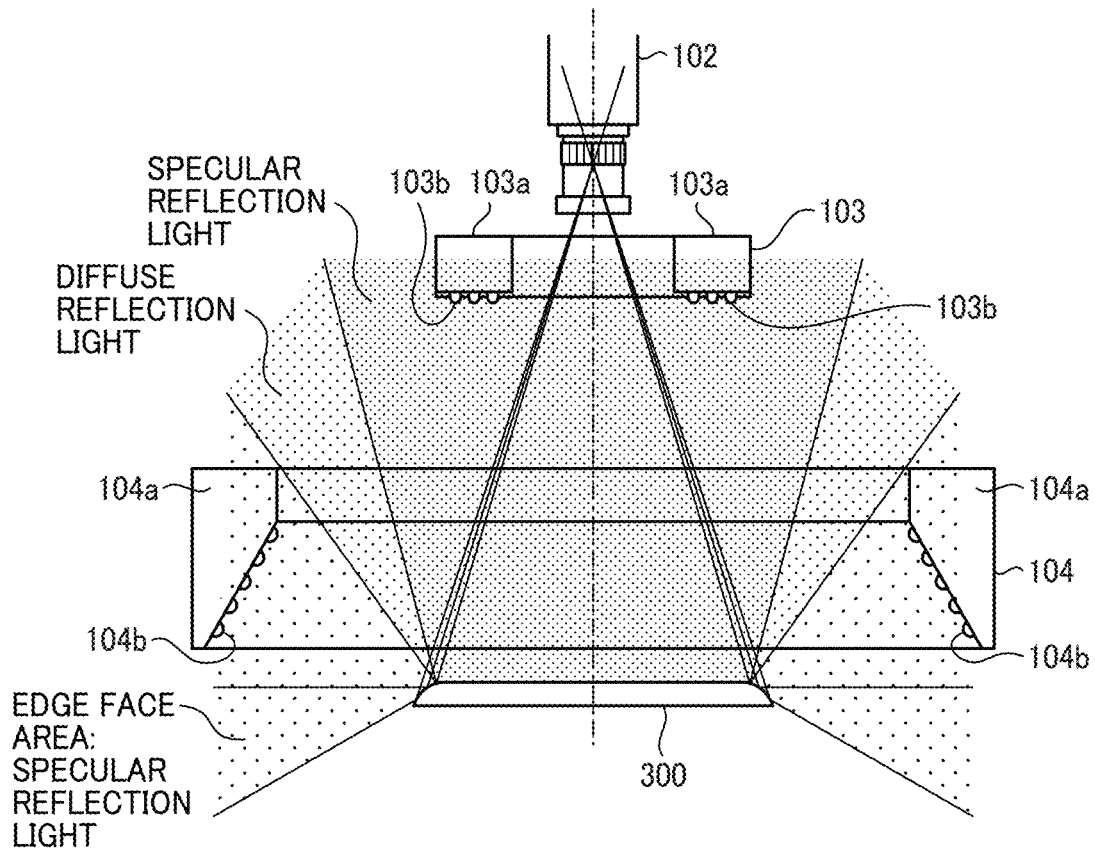
FIG. 4 is a diagram illustrating a layout configuration of each lighting device, according to an embodiment of the present disclosure.

FIG. 4 is a diagram illustrating a layout configuration of each lighting device.

The first encircled lighting device 103 includes a main unit 103a having a ring shape, which is a first main unit. Because the main unit 103a has the ring shape, the inspection target object 300 is imaged by the image capturing device 102. The first encircled lighting device 103 includes a plurality of light emitting diodes (LEDs) 103b, each being a first light source, on the lower face of the main unit 103a having the ring shape. The plurality of LEDs 103b irradiates the inspection target object 300 with light, the inspection target object being provided at an imaging position of the image capturing device 102 from the upper direction (vertical direction).

As illustrated in FIG. 4, the light from the first encircled lighting device 103 becomes specular reflection light and diffuse reflection light for the image capturing device 102 at the flat face area 301 of the inspection target object 300. Further, the light emitted the first encircled lighting device 103 becomes diffuse reflection light for the image capturing device 102 at the edge face area 302 of the inspection target object 300.

Although the description given above is of an example in which the first encircled lighting device 103 includes the main unit 103a having the ring shape, the embodiments are not limited thereto. In another example, the first encircled lighting device 103 is configured by arranging a plurality of lights having a fragmented shape in a ring form. In still another example, the first encircled lighting device 103 is configured by arranging a plurality (e.g., four) of small-scale light at the top, bottom, left, and right on a circumference in the planar view.

The second encircled lighting device 104 includes a main unit 104a having a ring shape, which is a second main unit. Because the main unit 104a has the ring shape, the inspection target object 300 is imaged by the image capturing device 102. The second encircled lighting device 104 includes a plurality of LEDs 104b, which are light sources, on the inner wall of the main unit 104a having the ring shape. The inner wall of the main unit 104a having the ring shape has a tapered shape such that the inner wall of the main unit extends from the upper side to the lower side. The plurality of LEDs 104b irradiate the inspection target object 300 with light, the inspection target object being provided at the imaging position of the image capturing device 102, from an oblique direction (e.g., 30 degrees) with respect to the vertical direction.

As illustrated in FIG. 4, the light from the second encircled lighting device 104 becomes specular reflection light and diffuse reflection light for the image capturing device 102 at the flat face area 301 of the inspection target object 300. Further, the light emitted the second encircled lighting device 104 becomes specular reflection light and diffuse reflection light for the image capturing device 102 at the edge face area 302 of the inspection target object 300.

Although the description given above is of an example in which the second encircled lighting device 104 includes the main unit 104a having the ring shape, the embodiments are not limited thereto. In another example, the second encircled lighting device 104 is configured by arranging a plurality of lights having a fragmented shape in a ring form. In still another example, the second encircled lighting device 104 is configured by arranging a plurality (e.g., four) of small-scale light at the top, bottom, left, and right on a circumference in the planar view.

The light coming the backlight lighting device 105 is used to capture an image (i.e., silhouette image) indicating or representing a region (contour) of the inspection target object 300 using the image capturing device 102.

In the embodiment, the first encircled lighting device 103 functions as a lighting device for imaging the edge face area 302 of the inspection target object 300. Further, the second encircled lighting device 104 functions as a lighting device for imaging the flat face area 301 of the inspection target object 300, which is inside the edge face area 302. Further, the backlight lighting device 105 functions as a lighting device for recognizing a region (contour) of the inspection target object 300.

In the embodiment, the image captured by the image capturing device 102 by emitting the light from the first encircled lighting device 103 and the image captured by the image capturing device 102 by emitting the light from the second encircled lighting device 104 are synthesized to acquire an entire image of the inspection target object 300.

A description is now given of the slide stage 106. The slide stage 106 is a guide that guides the inspection target object 300 to the imaging position of the image capturing device 102.

Figure 5:
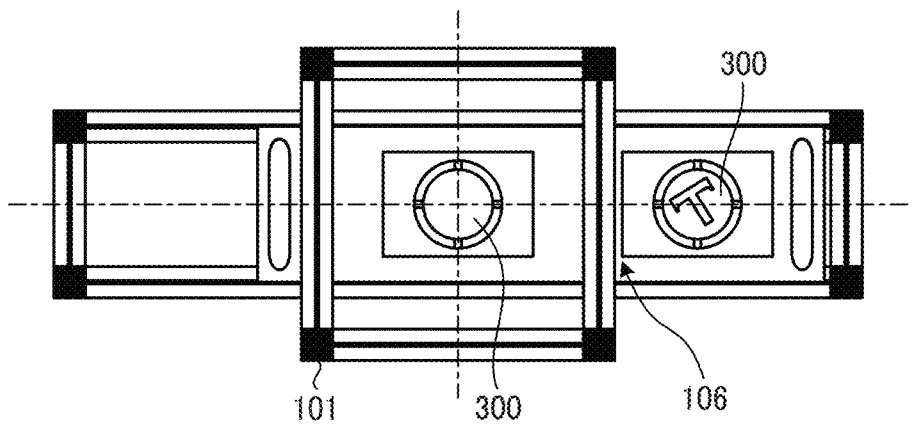
FIG. 5 is a view of a slide stage viewed from the upper direction, according to an embodiment of the present disclosure.

FIG. 5 is a view of the slide stage 106 viewed from the upper direction. As illustrated in FIG. 5, the slide stage 106 is configured to hold the inspection target object 300 at two positions (i.e., hold two inspection target objects). When the slide stage 106 moves to the right and left by using a slide mechanism, the inspection target objects 300 move to the imaging position of the image capturing device 102 alternately.

As illustrated in FIG. 3, the slide stage 106 includes a ratchet mechanism 106a. The slide stage 106 fixes the inspection target object 300 at the imaging position of the image capturing device 102 using the ratchet mechanism 106a.

As illustrated in FIG. 3, the slide stage 106 further includes a sensor 106b and a sensor 106c. The sensor 106b and the sensor 106c are each a non-contact sensor. When the inspection target object 300 on the right side is fixed at the imaging position of the image capturing device 102, the sensor 106b is turned on. On the other hand, when the inspection target object 300 on the left side is fixed at the imaging position of the image capturing device 102, the sensor 106c is turned on.

Further, the movement of the slide stage 106 is absorbed by an absorber 106d provided on the left and right sides.

The description given above is of an example in which the slide stage 106 is applied as the guide unit for guiding the inspection target object 300 to the imaging position of the image capturing device 102, the embodiments are not limited thereto. In another example, the guide member is a revolver guide that guides the inspection target object 300 while rotating the inspection target object to the imaging position of the image capturing device 102.

A description is now given of a connection of electrical components of the inspection system 1.

Figure 6:
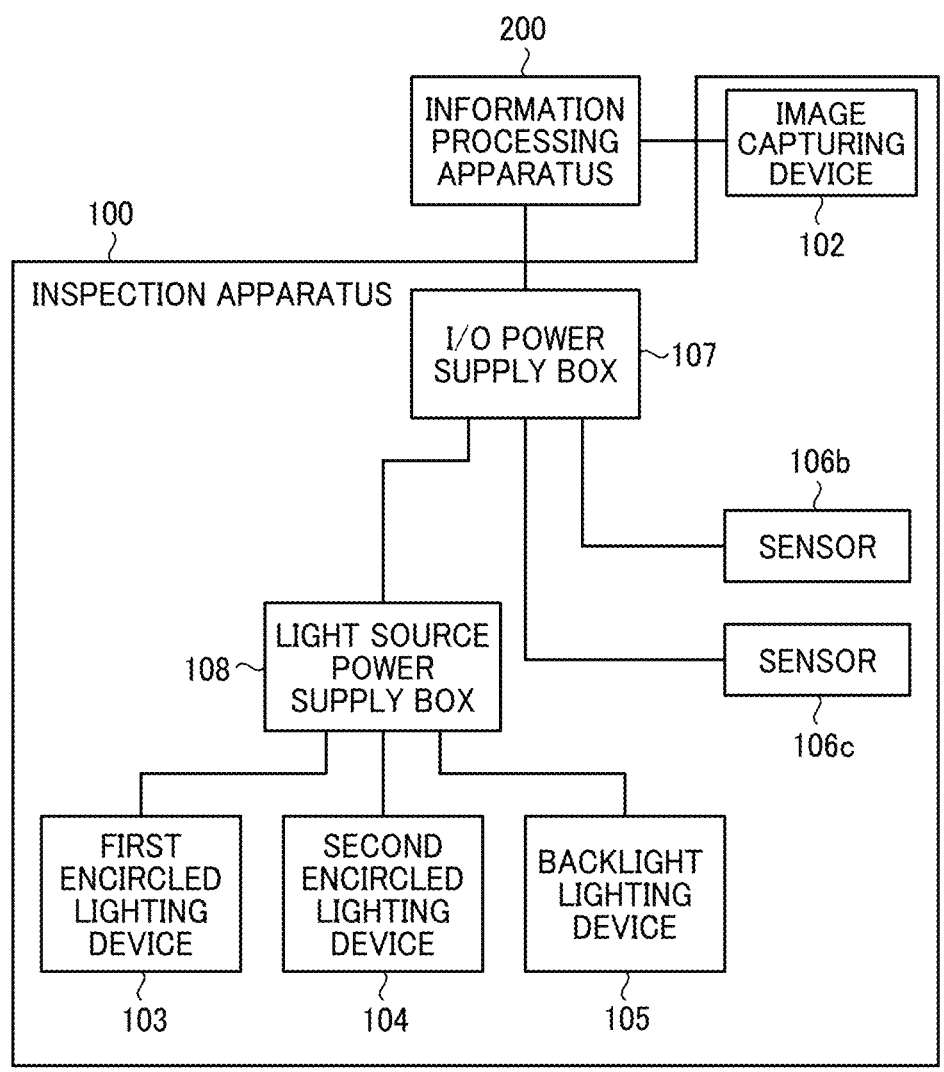
FIG. 6 is a block diagram illustrating an example of a connection of electrical components of the inspection system, according to an embodiment of the present disclosure.

FIG. 6 is a block diagram illustrating an example of a connection of electrical components of the inspection system 1. As illustrated in FIG. 6, the inspection apparatus 100 includes an input/output (I/O) power supply box 107 and a light source power supply box 108. The information processing apparatus 200 is connected to the inspection apparatus 100 via the I/O power supply box 107.

The first encircled lighting device 103, the second encircled lighting device 104, and the backlight lighting device 105 are connected to the information processing apparatus 200 via the I/O power supply box 107 and the light source power supply box 108. The information processing apparatus 200 controls turning on and off of LED lighting and controls the power of LED lighting of the first encircled lighting device 103, the second encircled lighting device 104, and the backlight lighting device 105.

The image capturing device 102 is connected directly to the information processing apparatus 200, and controlled by the information processing apparatus 200.

The sensor 106b and the sensor 106c of the slide stage 106 are connected to the information processing apparatus 200 via the I/O power supply box 107. The information processing apparatus 200 controls signal detection by the sensor 106b and the sensor 106c of the slide stage 106.

A description is now given of a hardware configuration of the information processing apparatus 200.

Figure 7:
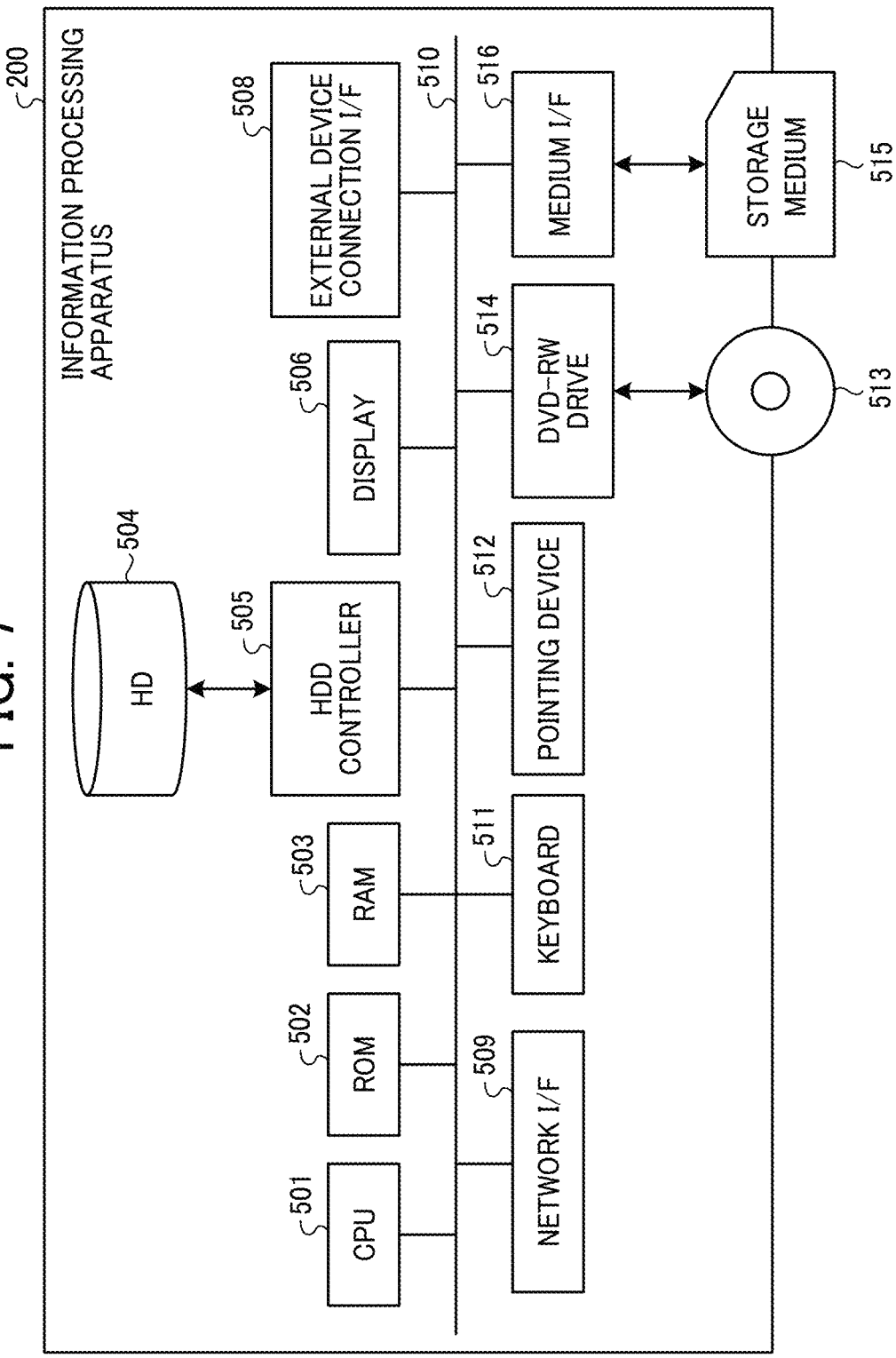
FIG. 7 is a block diagram illustrating an example of a hardware configuration of an information processing apparatus, according to an embodiment of the present disclosure.

FIG. 7 is a block diagram illustrating an example of a hardware configuration of the information processing apparatus 200.

As illustrated in FIG. 7, the information processing apparatus 200 is implemented by a computer. As illustrated in FIG. 7, the information processing apparatus 200 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a digital versatile disk-rewritable (DVD-RW) drive 514, and a medium I/F 516.

The CPU 501 controls overall operation of the information processing apparatus 200. The ROM 502 stores a control program such as an initial program loader (IPL) to boot the CPU 501. The RAM 503 is used as a work area for the CPU 501. The HD 504 stores various data such as a program. The HDD controller 505 controls reading or writing of various data from or to the HD 504 under control of the CPU 501. The display 506 displays various information such as a cursor, menu, window, characters, or image. The external device connection I/F 508 is an interface that connects the information processing apparatus 200 to various external devices. Examples of the external devices include, but are not limited to, a universal serial bus (USB) memory and a printer. The network I/F 509 is an interface that controls data communication performed with an external device through the communication network. Examples of the bus line 510 include, but are not limited to, an address bus and a data bus for electrically connecting the components such as the CPU 501 illustrated in FIG. 7 with each other.

The keyboard 511 is an example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 controls reading or writing of various data from or to a DVD-RW 513, which is an example of a removable storage medium. The removable storage medium is not limited to the DVD-RW and may be a digital versatile disk-recordable (DVD-R) or the like. The medium I/F 516 controls reading or writing of data from and to a storage medium 515 such as a flash memory.

A program to be executed by the information processing apparatus 200 according to the present embodiment is recorded as a file of an installable format or an executable format on a non-transitory computer-readable recording medium such as a compact disk read-only memory (CR-ROM), a flexible disk (FD), a compact disk recordable (CD-R), or a digital versatile disk (DVD).

In another example, the program to be executed by the information processing apparatus 200 according to the present embodiment is stored on a computer connected to a network such as the Internet and is provided be being downloaded via the network. In still another example, the program to be executed by the information processing apparatus 200 according to the present embodiment is provided or distributed via a network such as the Internet.

A description is now given of characteristic operation of the present embodiment, among various arithmetic processes performed by the CPU 501 of the information processing apparatus 200 by executing the program.

Figure 8:
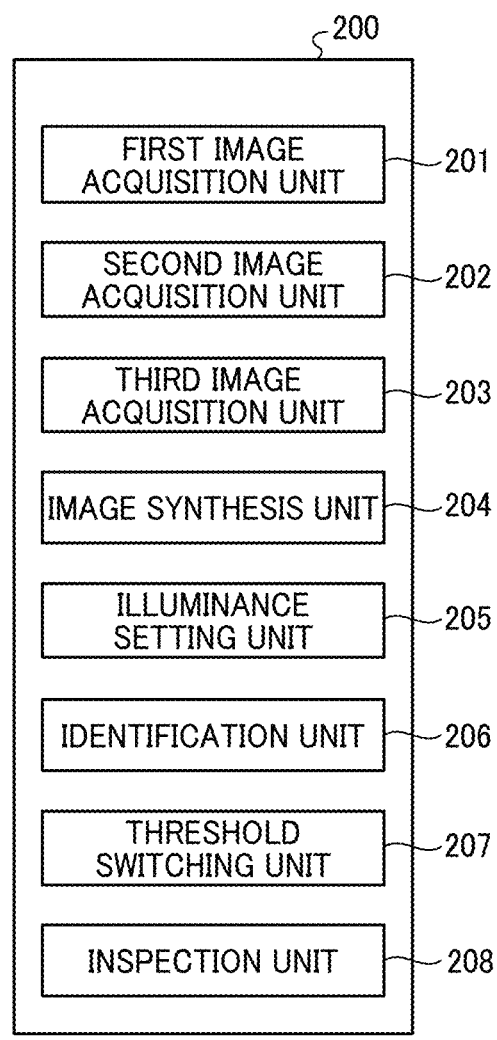
FIG. 8 is a block diagram illustrating an example of a functional configuration of the information processing apparatus, according to an embodiment of the present disclosure.

FIG. 8 is a block diagram illustrating an example of a functional configuration of the information processing apparatus 200. As illustrated in FIG. 8, the CPU 501 of the information processing apparatus 200 executes the program to implement a first image acquisition unit 201, a second image acquisition unit 202, a third image acquisition unit 203, an image synthesis unit 204, an illuminance setting unit 205, an identification unit 206, and a threshold switching unit 207, and an inspection unit 208.

The first image acquisition unit 201 acquires an image of the edge face area 302 of the inspection target object 300 as a first inspection target image of the inspection target object from an image (image obtained by diffuse reflection light) captured by the image capturing device 102 by emitting light from the first encircled lighting device 103.

The second image acquisition unit 202 acquires an image of the flat face area 301, excluding the edge face area 302 of the inspection target object 300, as a second inspection target image of the inspection target object from an image (image obtained by specular reflection light) captured by the image capturing device 102 by emitting the light from the second encircled lighting device 104.

The third image acquisition unit 203 acquires an image indicating or representing a region (contour) of the inspection target object 300 from an image (i.e., silhouette image) captured by the image capturing device 102 by emitting light from the backlight lighting device 105.

The image synthesis unit 204 synthesizes the image of the edge face area 302 of the inspection target object 300, the image of the flat face area 301 of the inspection target object 300, and the image indicating or representing the region (contour) the inspection target object 300, to obtain a synthesized image as an inspection target image. In another example, the image synthesis unit 204 synthesizes the image of the edge face area 302 of the inspection target object 300 and the image of the flat face area 301 of the inspection target object 300, to obtain the synthesized image as the inspection target image.

The illuminance setting unit 205 sets an illuminance level of the first encircled lighting device 103 and an illuminance level of the second encircled lighting device 104.

The identification unit 206 analyzes a master image (reference data) of the inspection target object 300, to determine whether a predetermined pattern is present. The master image is, for example, print data. The master image is created from print data. More specifically, the master image is created from print data in view of predicted image fluctuations due to printing or imaging. The image fluctuations indicate phenomena that occur during printing and imaging, such as color fluctuations, magnification fluctuations, and blurring. In another example, the captured image that is identified as having no defect by inspection is used as the master image. The predetermined pattern is, for example, a pattern similar to the shape of the inspection target object 300. Alternatively, the predetermined pattern is, for example, a pattern similar to point symmetry or line symmetry.

The threshold switching unit 207 switches a threshold value to be used when the inspection unit 208 compares the master image (reference data) of the inspection target object 300 with the inspection target image, according to the identification result of the image type of the master image identified by the identification unit 206. The threshold value is an example of a superordinate concept such as a decision criterion or a decision condition.

The inspection unit 208 compares the master image (reference data) of the inspection target object 300 with the inspection target image, for inspection. More specifically, when inspecting the print quality of the inspection target image, the inspection unit 208 uses the threshold value for determining the off-center of the inspection target image. When the comparison result does not satisfy the predetermined threshold value, the inspection unit 208 determines that the inspection target image is defective as being off-center.

A description is now given of characteristic operation among operations performed by the information processing apparatus 200 according to the embodiment.

Figure 9:
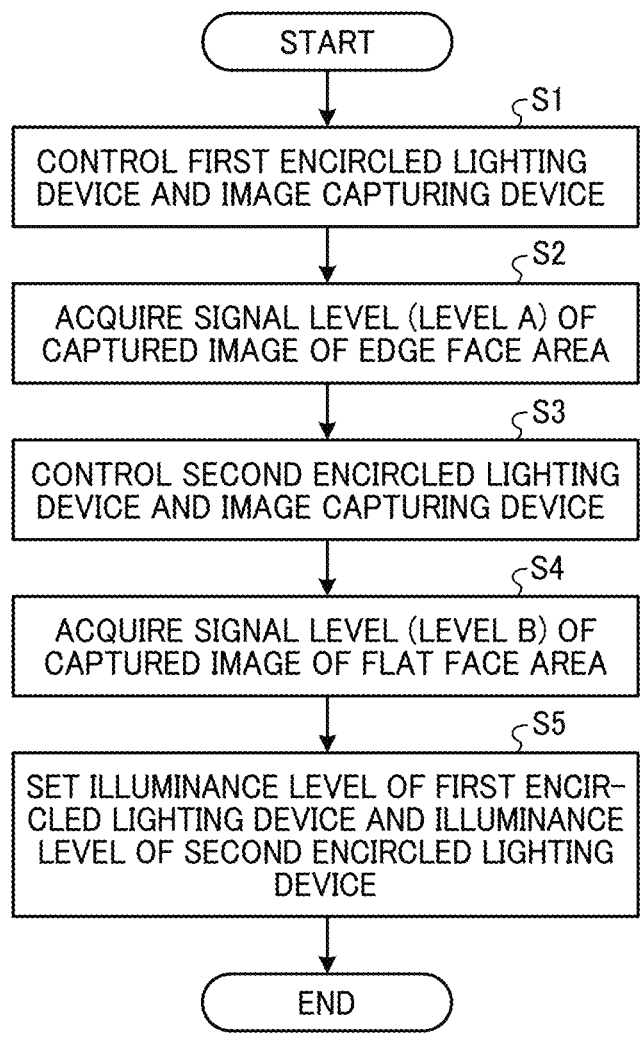
FIG. 9 is a flowchart illustrating steps in an operation of setting illuminance, according to an embodiment of the present disclosure.

First, a description is given of an operation of setting the illuminances of the two lighting devices such as the first encircled lighting device 103 and the second encircled lighting device 104, performed by the CPU 501 of the information processing apparatus 200. FIG. 9 is a flowchart illustrating steps in an operation of setting the illuminance.

The operation of setting the illuminance is performed on the inspection target object 300 whose flat face area 301 and the edge face area 302 have the same color (e.g., white).

As illustrated in FIG. 9, the illuminance setting unit 205 controls the first encircled lighting device 103 and the image capturing device 102 (step S1), to acquire a signal level (level A) of an image of the edge face area 302 obtained by imaging the inspection target object 300 using light emitted by the first encircled lighting device 103 (step S2).

Next, the illuminance setting unit 205 controls the second encircled lighting device 104 and the image capturing device 102 (step S3), to acquire a signal level (level B) of an image of the flat face area 301 obtained by imaging the inspection target object 300 using light emitted by the second encircled lighting device 104 (step S4).

Next, the illuminance setting unit 205 sets an illuminance level of the first encircled lighting device 103 and an illuminance level of the second encircled lighting device 104 so that the level A acquired in step S2 and the level B acquired in step S4 becomes the same level (step S5). For example, the illuminance setting unit 205 calculates a correction coefficient (a ratio of level A and level B) of a captured image signal so that the level A acquired in step S2 and the level B acquired in step S4 becomes the same level. The correction coefficient is used to correct an image captured by using the light emitted from the second encircled lighting device 104 at the time of the actual inspection.

Although in the present embodiment, the operation of setting the illuminance of the two lighting devices, i.e., the first encircled lighting device 103 and the second encircled lighting device 104 is described, the embodiment is not limited thereto. In another example, the focus adjustment of the image capturing device 102 is also performed.

Figure 10:
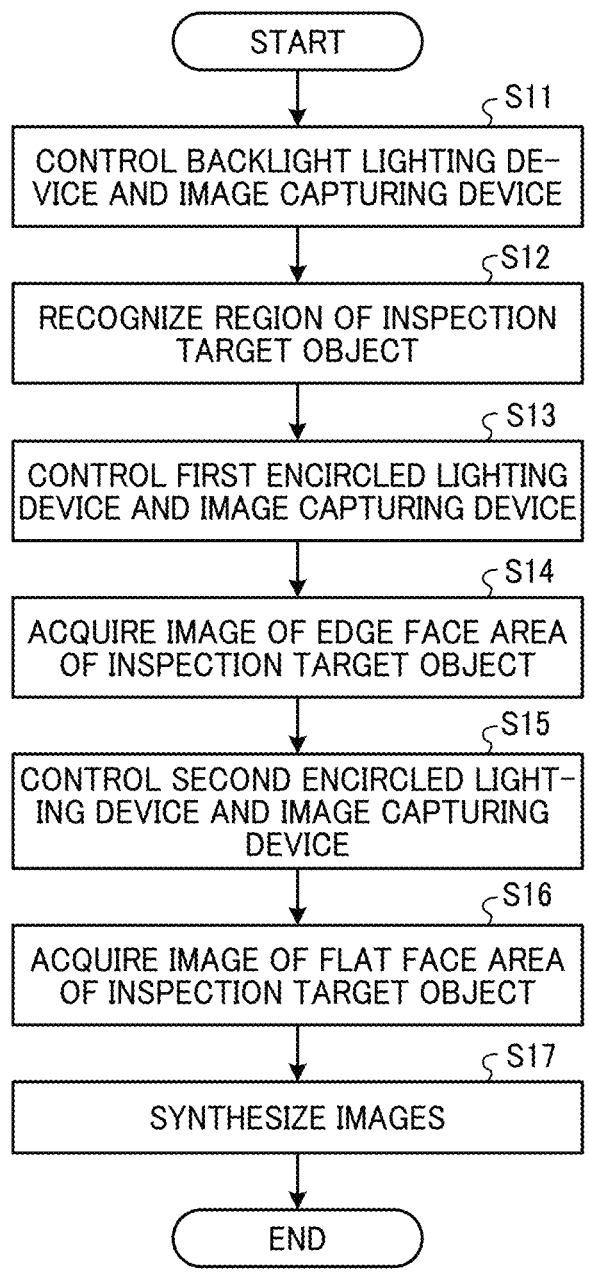
FIG. 10 is a flowchart illustrating steps in an operation of synthesizing images, according to an embodiment of the present disclosure.
Figure 11:
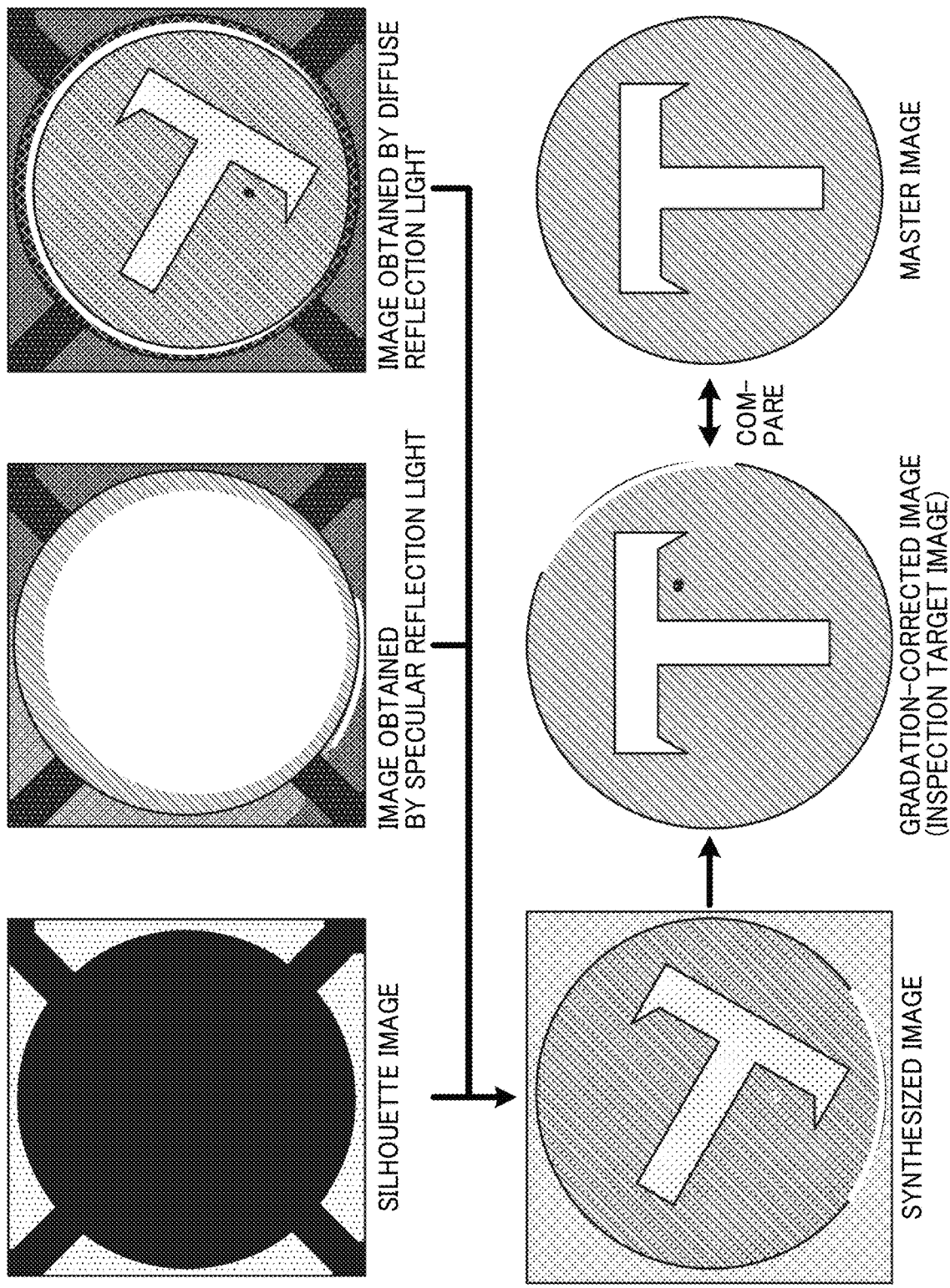
FIG. 11 is a diagram illustrating an example of image synthesis, according to an embodiment of the present disclosure.

A description is now given of an operation of synthesizing images performed by the CPU 501 of the information processing apparatus 200. FIG. 10 is a flowchart illustrating steps in an operation of synthesizing images. FIG. 11 is a diagram illustrating an example of image synthesis.

As illustrated in FIG. 10, the third image acquisition unit 203 controls the backlight lighting device 105 and the image capturing device 102 (step S11), to recognizes a region (contour) of the inspection target object 300 from an image (i.e., silhouette image) obtained by imaging the inspection target object 300 using light emitted from the backlight lighting device 105 (step S12).

More specifically, in step S12, the third image acquisition unit 203 performs various processing, such as measurement of setting position (x, y) of the inspection target object 300, calculation of circular size of the inspection target object 300, determination of background image region of the inspection target object 300, and determination of setting error of the inspection target object 300.

Next, the first image acquisition unit 201 controls the first encircled lighting device 103 and the image capturing device 102 (step S13), to acquire an image of the edge face area 302 of the inspection target object 300 from an image (image obtained by diffuse reflection light) obtained by imaging the inspection target object 300 using light emitted from the first encircled lighting device 103 (step S14).

More specifically, in step S13, the first image acquisition unit 201 acquires four captured images (images obtained by diffuse reflection light) obtained by imaging the inspection target object 300. Next, in step S14, the first image acquisition unit 201 performs an image averaging processing on the four captured images (images obtained by diffuse reflection lights), and then records the image of the edge face area 302 of the inspection target object 300.

Then, the second image acquisition unit 202 controls the second encircled lighting device 104 and the image capturing device 102 (step S15), to acquire an image of the flat face area 301 of the inspection target object 300 from the image (image obtained by specular reflection light) captured by imaging the inspection target object 300 using the light emitted from the second encircled lighting device 104 (step S16).

More specifically, in step S15, the second image acquisition unit 202 acquires four captured images (images obtained by regular reflection light) obtained by imaging the inspection target object 300. Next, in step S16, the second image acquisition unit 202 performs an image averaging processing on the four captured images (images obtained by specular reflection light), and then records the image of the flat face area 301 of the inspection target object 300.

The order of the processes of steps S13 to S16 as indicated in the above-described flowchart is one example. In another example, after the second image acquisition unit 202 controls the second encircled lighting device 104 and the image capturing device 102 (step S15), to acquire the image of the flat face area 301 of the inspection target object 300 (step S16), the first image acquisition unit 201 controls the first encircled lighting device 103 and the image capturing device 102 (step S13), to acquire the image of the edge face area 302 of the inspection target object 300 (step S14).

Finally, the image synthesis unit 204 synthesizes the image of region (contour) of the inspection target object 300 recognized in step S12, the image of the edge face area 302 of the inspection target object 300 acquired in step S14, and the image of the flat face area 301 of the inspection target object 300 acquired in step S16 (step S17).

In the image synthesis process of step S17, the image synthesis unit 204 performs various processing, such as x-y axis center pattern matching, rotation angle acquisition, x-y center affine conversion, and re-sampling. Further, in the image synthesis process of step S17, the image synthesis unit 204 also performs gradation correction process of applying gradation correction to the synthesized image.

Then, the synthesized image generated as described above is used as the inspection target image of the inspection target object 300. For example, the inspection target image is compared with the master image for inspecting the printing quality.

Figure 12:
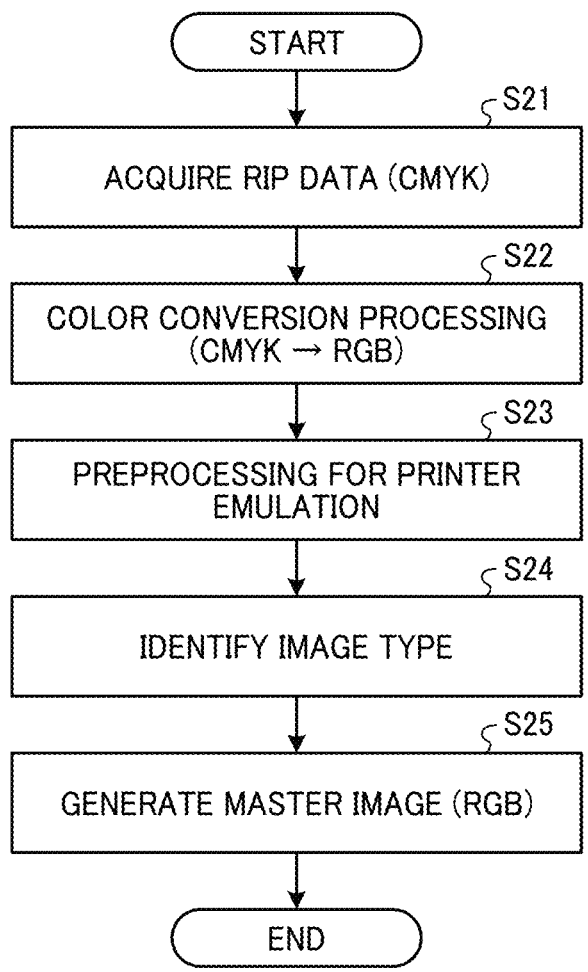
FIG. 12 is a flowchart illustrating steps in an operation of identifying an image type, according to an embodiment of the present disclosure.

A description is now given of an operation of identifying an image type performed by the CPU 501 of the information processing apparatus 200. FIG. 12 is a flowchart illustrating steps in an operation of identifying an image type.

As illustrated in FIG. 12, the identification unit 206 acquires data (CMYK) on which raster image processor processing is performed (step S21), and performs color mode conversion on the acquired RIP data from CMYK to RGB (step S22).

Next, the identification unit 206 performs preprocessing for printer emulation such as smoothing processing (step S23).

Next, the identification unit 206 performs an image type identification process of identifying an image type of an image of the inspection target object 300 (step S24), and generates a master image (step S25). A description is now given of the reason why the image type identification process in step S24 is to be performed.

When the print quality of the inspection target image of the inspection target object 300 is visually judged by an inspector, a judgement threshold value used for judging an off-center of an image varies depending on a state of an outer periphery and an inner periphery of a picture. The off-center of the image means that the position of the image is deviated from the center. In particular, the inspector strictly judges the off-center of the image, with respect to a picture having a circle similar to the inspection target object 300 having a disk shape. For example, FIG. 13 is a diagram illustrating examples of types of the picture. As illustrated in FIG. 13, examples of the types of the pictures having a circle similar to the inspection target object 300 having a disk shape include the following three types, i.e., Type 1 to Type 3.

Type 0 is a "Normal" type, in which a picture is printed on an entire area.

Figure 14:
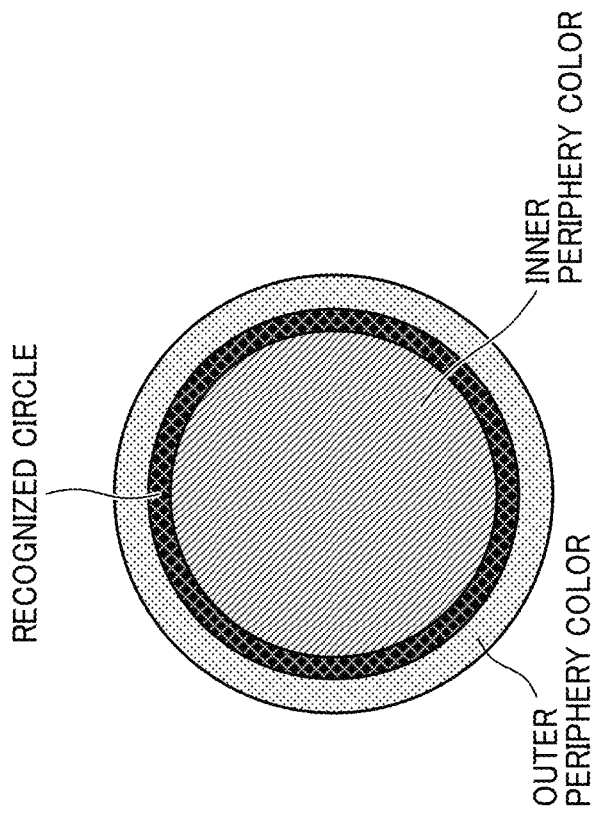
FIG. 14 is a diagram illustrating examples of pictures having different states of an outer periphery and an inner periphery, according to an embodiment of the present disclosure.

The judgment threshold value used in inspecting the print quality of the inspection target image is changed among Type 1 to Type 3 depending on the state of the outer periphery and the inner periphery of the picture. FIG. 14 is a diagram illustrating examples of pictures having different states of the outer periphery and the inner periphery. As indicated in FIG. 14, a pattern is classified as any one of Type 1 to Type 3 depending on the number of colors of an outer periphery color of the picture and a dominant color of an inner periphery color.

Type 1 is a "Circle" type, which has a circle near the outer periphery and has a solid area. As indicated in FIG. 14, with respect to Type 1, the number of color of the outer periphery color is one, and the inner periphery color is different from the outer periphery color.

Type 2 is a "Circle & Picture" type, which has a circle near the outer periphery and has no solid area. As indicated in FIG. 14, with respect to type 2, the number of the outer periphery color is one, and the inner periphery is same as the outer periphery color.

Type 3 is a "Circle in Picture" type, which has a circle in a picture printed on an entire area. As indicated in FIG. 14, with respect to Type 3, the number of colors of the outer periphery is plural, and the inner periphery color is different from the outer periphery color. In another example, a pattern is classified as either Type 2 or Type 3 according to the ratio of the solid amount.

Figure 15A:
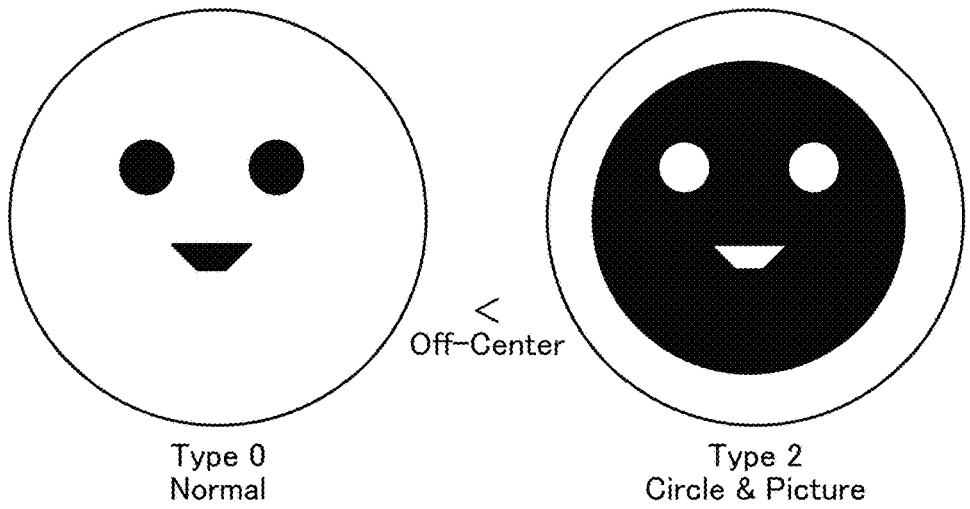
FIGS. 15A to 15C are diagrams indicating the difficulty of comparing widths, according to an embodiment of the present disclosure.
Figure 15B:
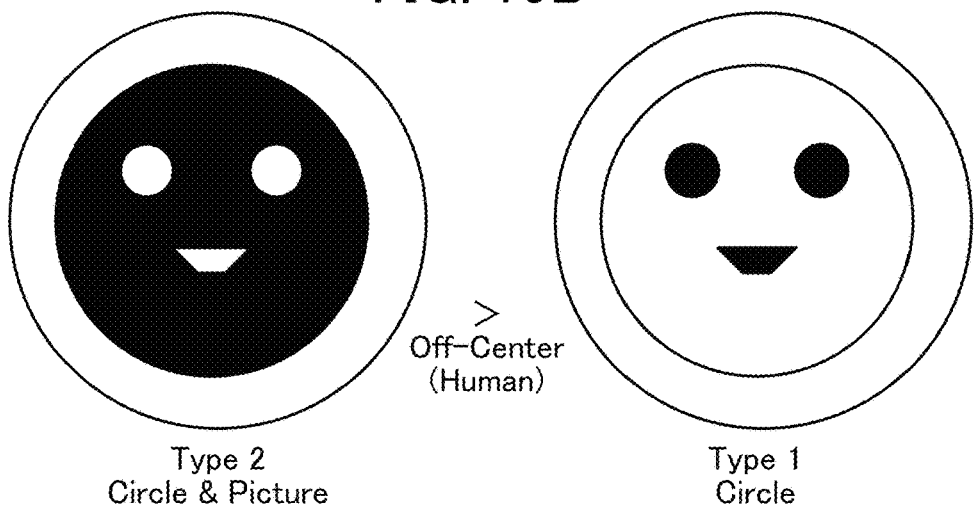
Figure 15C:
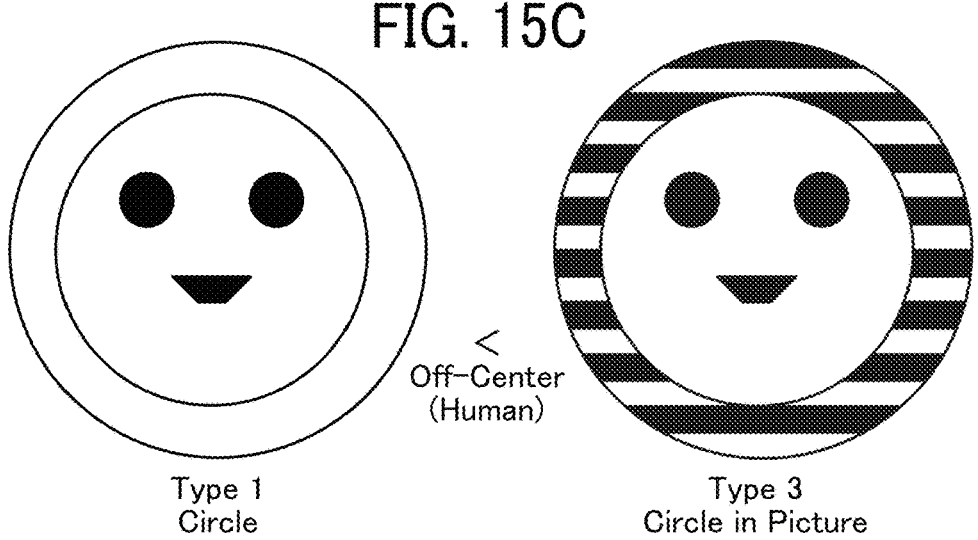

When the inspector visually judges the off-center as the print quality of the inspection target image, the inspector compares the widths of the outer periphery color of the inspection target image at the line or point symmetric position, and judges whether the widths of the outer shape at the line or point symmetric position (left/right, up/down, diagonal position, etc.) match with each other. FIGS. 15A to 15C are diagrams indicating the difficulty of comparing the widths. The easier the comparison between the widths, the stricter inspection is required. As illustrated in FIG. 15A, the comparison between widths in the pattern of Type 0 is more difficult to the comparison between widths in the pattern of type 2. As illustrated in FIG. 15B, the comparison between widths in the pattern of Type 2 is more difficult to the comparison between widths in the pattern of type 1. As illustrated in FIG. 15C, the comparison between widths in the pattern of Type 3 is more difficult to the comparison between widths in the pattern of type 1.

Figure 16:
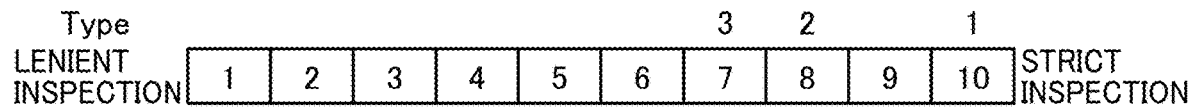
FIG. 16 is a diagram illustrating an example of a judgement threshold value when an off-center is to be inspected as a print quality of an inspection target image, according to an embodiment of the present disclosure.

FIG. 16 is a diagram illustrating an example of the judgement threshold value when the off-center is to be inspected as the print quality of the inspection target image. As described above, since it is easy for the inspector to compare the widths of the outer periphery color of the inspection target image of the picture of Type 1, a stricter inspection is required than the inspection of the picture of Type 2 or the picture of Type 3. Further, the picture of Type 2 requires a stricter inspection than the picture of Type 3.

To address this issue, in the present embodiment, the pattern of the picture of the inspection target object 300 is identified, and the off-center inspection is performed in a manner suitable for the identified pattern type such as Normal, Circle, Circle & Picture, and Circle in Picture.

Figure 17:
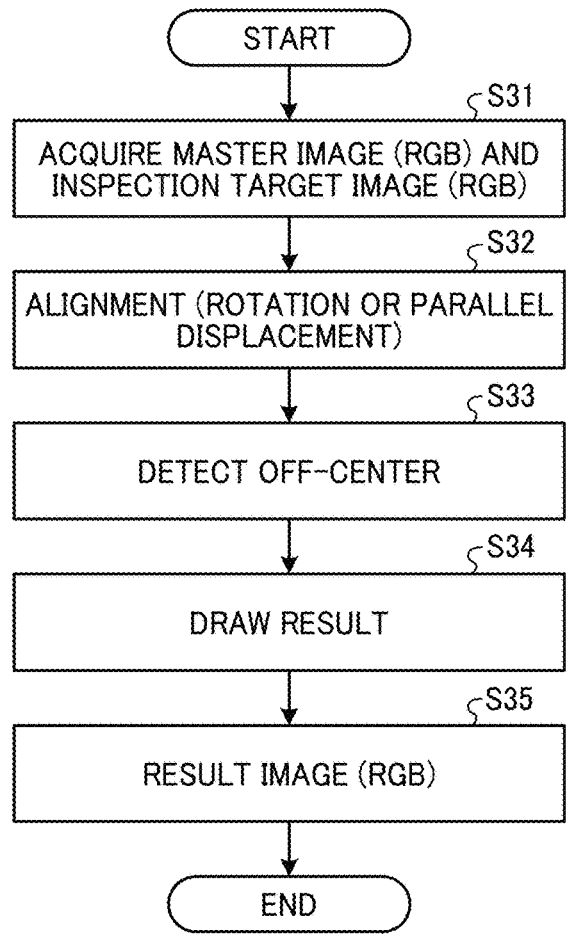
FIG. 17 is a flowchart illustrating steps in an inspection operation by image comparison, according to an embodiment of the present disclosure.

A description is now given of an inspection operation by image comparison performed by the CPU 501 of the information processing apparatus 200. FIG. 17 is a flowchart illustrating steps in an inspection operation by image comparison.

As illustrated in FIG. 17, the inspection unit 208 acquires the master image (RGB) and the inspection target image (RGB) (step S31), and moves the master image and the inspection target image by rotation or parallel displacement to perform alignment (step S32).

Next, the inspection unit 208 compares the master image with the inspection target image, to perform an inspection for detecting the off-center (step S33). The threshold switching unit 207 switches the threshold value used in comparing the master image of the inspection target object 300 with the inspection target image according to the identification result of the image type of the master image by the identification unit 206.

More specifically, the threshold switching unit 207 obtains a threshold value (Th) for each image type based on a threshold value ($Th_{Normal}$), which is a value designated in advance by a user as a tolerable positional deviation, using the following equation.

$$Th = C_{type} \times Th_{Normal}$$

Figures 18, 19:
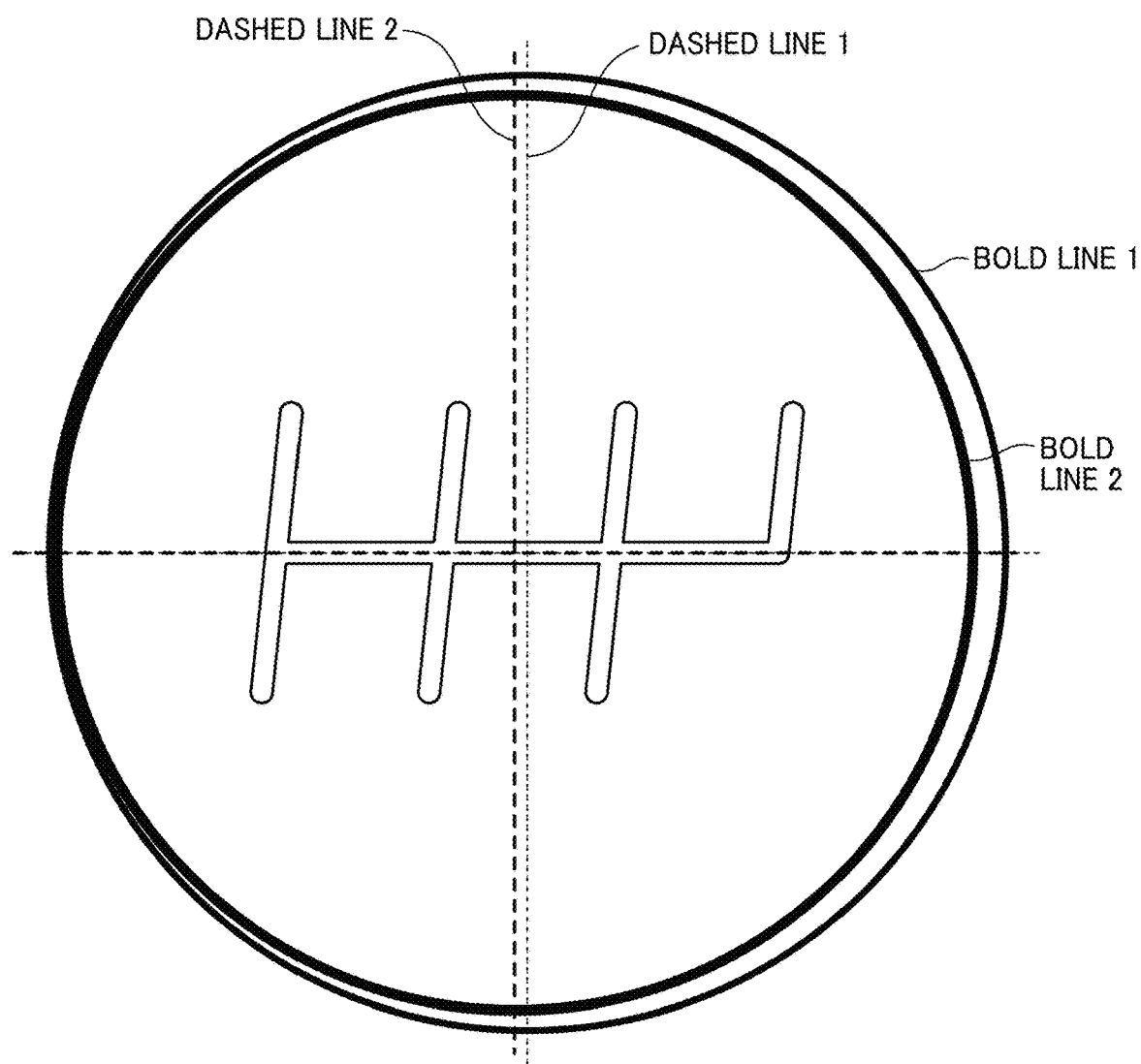
FIG. 18 is an example of a table storing a coefficients $C_{Type}$ associated with the image types, according to an embodiment of the present disclosure.
FIG. 19 is a diagram illustrating an example of an inspection result obtained by detecting the off-center, according to an embodiment of the present disclosure.

The threshold switching unit 207 calculates the coefficient $C_{Type}$ according to the image type of the master image identified by the identification unit 206. FIG. 18 is an example of a table storing the coefficients $C_{Type}$ associated with the image types. The threshold switching unit 207 acquires the coefficient $C_{Type}$ as indicated in the table of FIG. 18 corresponding to the image type. The stricter the inspection required for the image type, the smaller value the coefficient $C_{Type}$. Accordingly, the stricter the inspection required for the image type, the smaller value the threshold value (Th).

Next, the inspection unit 208 draws an inspection result obtained by detecting the off-center (step S34).

FIG. 19 is a diagram illustrating an example of the inspection result obtained by detecting the off-center. As illustrated in FIG. 19, the inspection unit 208 displays an image drawing the positional deviation in a circular shape as an inspection result on the display 506. As illustrated in FIG. 19, the inspection unit 208 displays Bold line 1 and Bold line 2 as being superimposed on each other. Bold line 1 indicates the outer shape (edge) of the inspection target object 300, which is information detected from the master image. Bold line 2 indicates the outer circumference (edge) of the inspection target image shifted by the off-center, which is information obtained from the comparison result between the master image and inspection target image. Further, the inspection unit 208 displays Dashed line 1 and Dashed line 2 as being superimposed on each other. Dashed line 1 indicates the center of the inspection target object 300. Dashed line 2 indicates the center of the inspection target image shifted by the off-center.

Although in the present embodiment, the description given above of an example in which the outer shape (edge) of the inspection target object 300, which is information detected from the master image, and the outer circumference (edge) of the inspection target image shifted by the off-center, which is information obtained from the comparison result between the master image and inspection target image, the embodiment is not limited thereto. In another example, the center of the outer shape of the inspection target object 300, which is information detected from the master image, and the center of the outer circumference of the inspection target image shifted by the off-center, which is the information obtained from the comparison result between the master image and the inspection target image, are displayed as being superimposed on each other.

Since as described above, the both information are displayed as being superimposed on each other, the result of the off-center is presented in a manner that the inspector intuitively recognizes the result. Accordingly, the positional deviation at the time of printing is presented in a manner that the inspector intuitively recognizes the positional deviation.

Finally, the inspection unit 208 notifies whether the positional deviation of the inspection target image is acceptable based on the inspection result of detecting the off-center, by, for example, displaying such information on the display 506 (step S35), and the operation ends.

As described above, according to the present embodiment, the identification unit 206 analyzes the master image (reference data) to be printed, to identify the presence or absence of a predetermined pattern such as a pattern (e.g., a circular pattern) that is similar to the shape of the inspection target object 300 (e.g., a medium having a circular shape). Further, according to the identification result, the threshold switching unit 207 switches the threshold value used in comparing the master image (reference data) with the inspection target image by the inspection unit 208. Thus, the sensitivity of the positional deviation inspection at the time of printing is appropriately switched in view of an influence of the print pattern of the inspection target object 300. This reduces the burden on the inspector and enables efficient inspection, even when there are many design variations of the inspection target object.

Although in the present embodiment, the description given above is of an example in which the pattern (e.g., a picture having a circular pattern) similar to the inspection target object 300 having a circular shape, the embodiment is not limited thereto. In another example, a pattern (e.g., a picture having a polygonal pattern) similar to the inspection target object 300 having a polygonal shape is printed. Further, the picture does not necessarily have a shape similar to the shape of the inspection target object 300. For example, the embodiment is applicable to a case in which a picture having a polygonal pattern is printed on the inspection target object 300 having a circular shape. Further, the same processing is applicable to a case in which a picture itself is a horizontally symmetrical pattern or a vertically symmetrical pattern.

Second Embodiment

A description is now given of a second embodiment.

The second embodiment is different from the first embodiment in that the threshold value (Th) for each image type is obtained in consideration of the diameter of the recognized circle (the inner periphery). In the second embodiment, the elements, functions, processes, and steps that are the same or substantially the same as those described in the first embodiment are denoted by the same reference numerals or step numbers, and redundant descriptions thereof are omitted below.

Figure 20A:
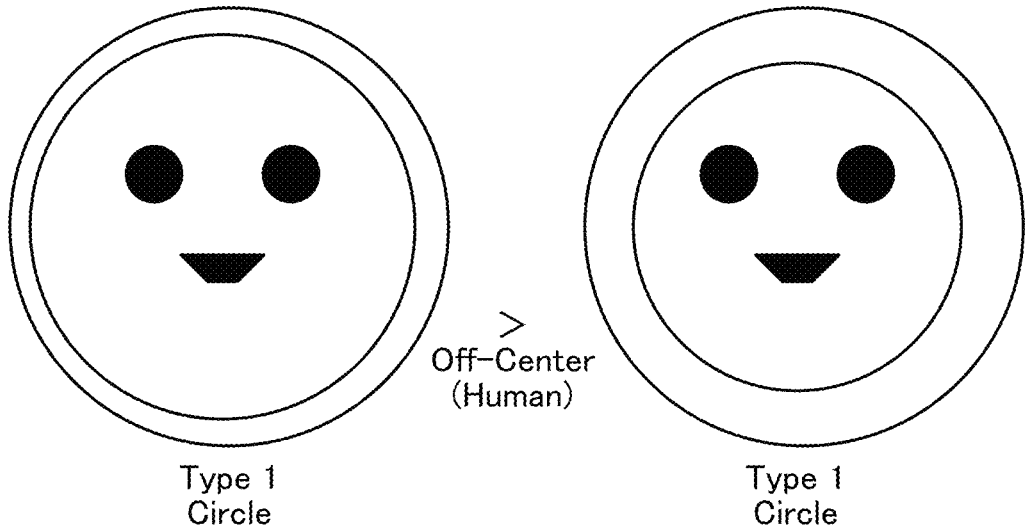
FIGS. 20A and 20B are diagrams indicating the difficulty of comparing widths according to a diameter of a circle, according to a second embodiment of the present disclosure.
Figure 20B:
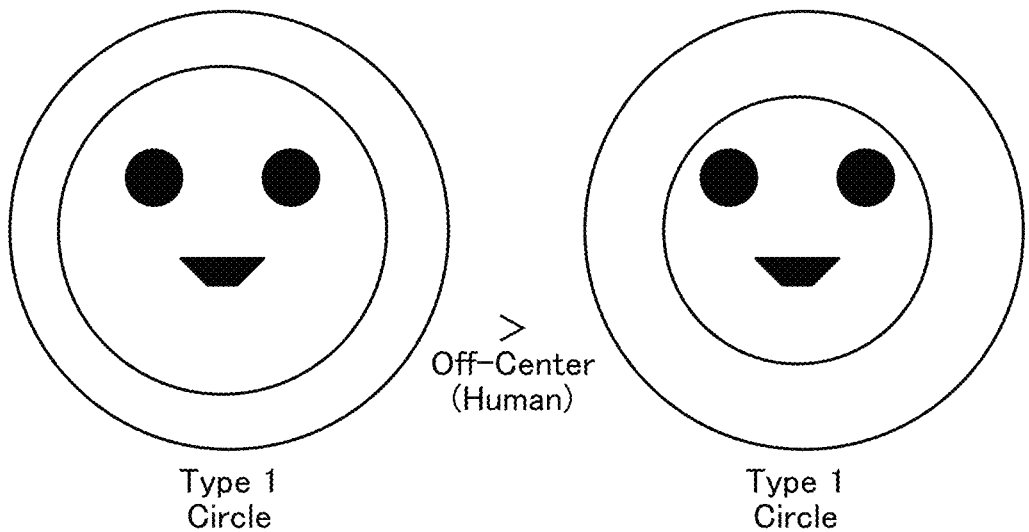

FIGS. 20A and 20B are diagrams indicating the difficulty of comparing widths according to the diameter of the circle, according to the second embodiment. The easier the comparison between the widths, the stricter inspection is required. As illustrated in FIGS. 20A and 20B, for example, the smaller the diameter of the inner periphery Type 1, that is, the farther the inner circumference from the outer circumference, the more difficult the comparison between the widths. In other words, the larger the diameter of the inner periphery, the stricter inspection is required.

To address such issue, in the present embodiment, the threshold value (Th) for each image type is obtained in consideration of the diameter of the recognized circle (the inner periphery).

Figure 21:
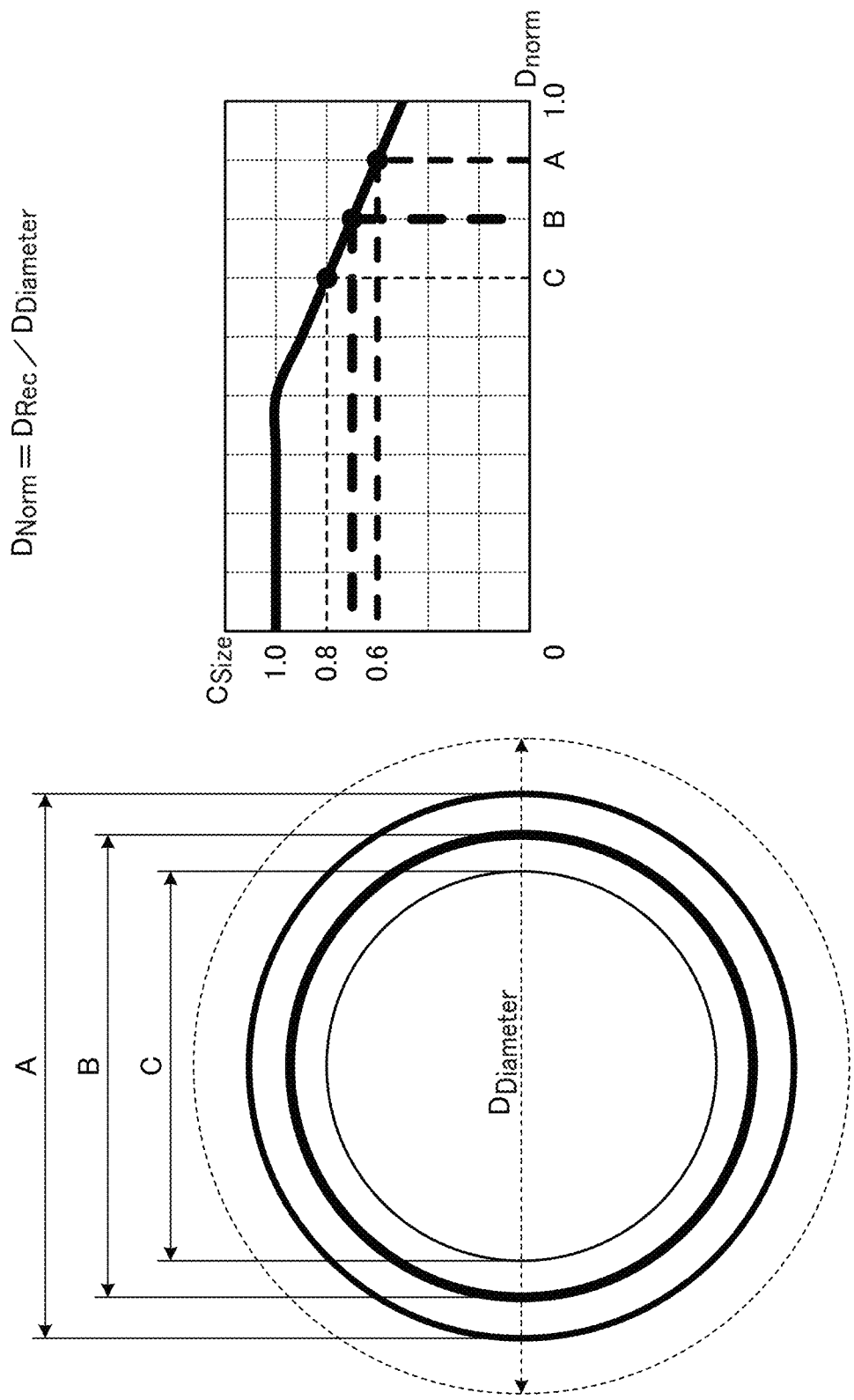
FIG. 21 is a diagram schematically illustrating a threshold coefficient corresponding to the diameter of an inner periphery circle, according to an embodiment of the present disclosure.

FIG. 21 is a diagram schematically illustrating a threshold coefficient corresponding to the diameter of the inner periphery circle. As illustrated in FIG. 21, the threshold switching unit 207 acquires a coefficient $C_{size}$ according to the inner periphery circle. The larger the diameter, i.e., the stricter inspection is required, the smaller the value of the coefficient $C_{size}$. Therefore, the larger the diameter of the inner periphery circle, i.e., the stricter inspection is required, the smaller the threshold value (Th).

Accordingly, the threshold switching unit 207 obtains the threshold value (Th) for each image type using the following equation in step S33 described above with reference to FIG. 17.

$$Th = C_{Type} \times C_{Size} \times Th_{Normal}$$

Thus, according to the present embodiment, the accuracy of the inspection is improved.

Third Embodiment

A description is now given of a third embodiment.

The third embodiment is different from the first embodiment or the second embodiment in that information is presented based on which one can tell whether a submitted design of the master image (reference data) is appropriate without difficulty. In the third embodiment, the elements, functions, processes, and steps that are the same or substantially the same as those described in the first embodiment or the second embodiment are denoted by the same reference numerals or step numbers, and redundant descriptions thereof are omitted below.

Figure 22:
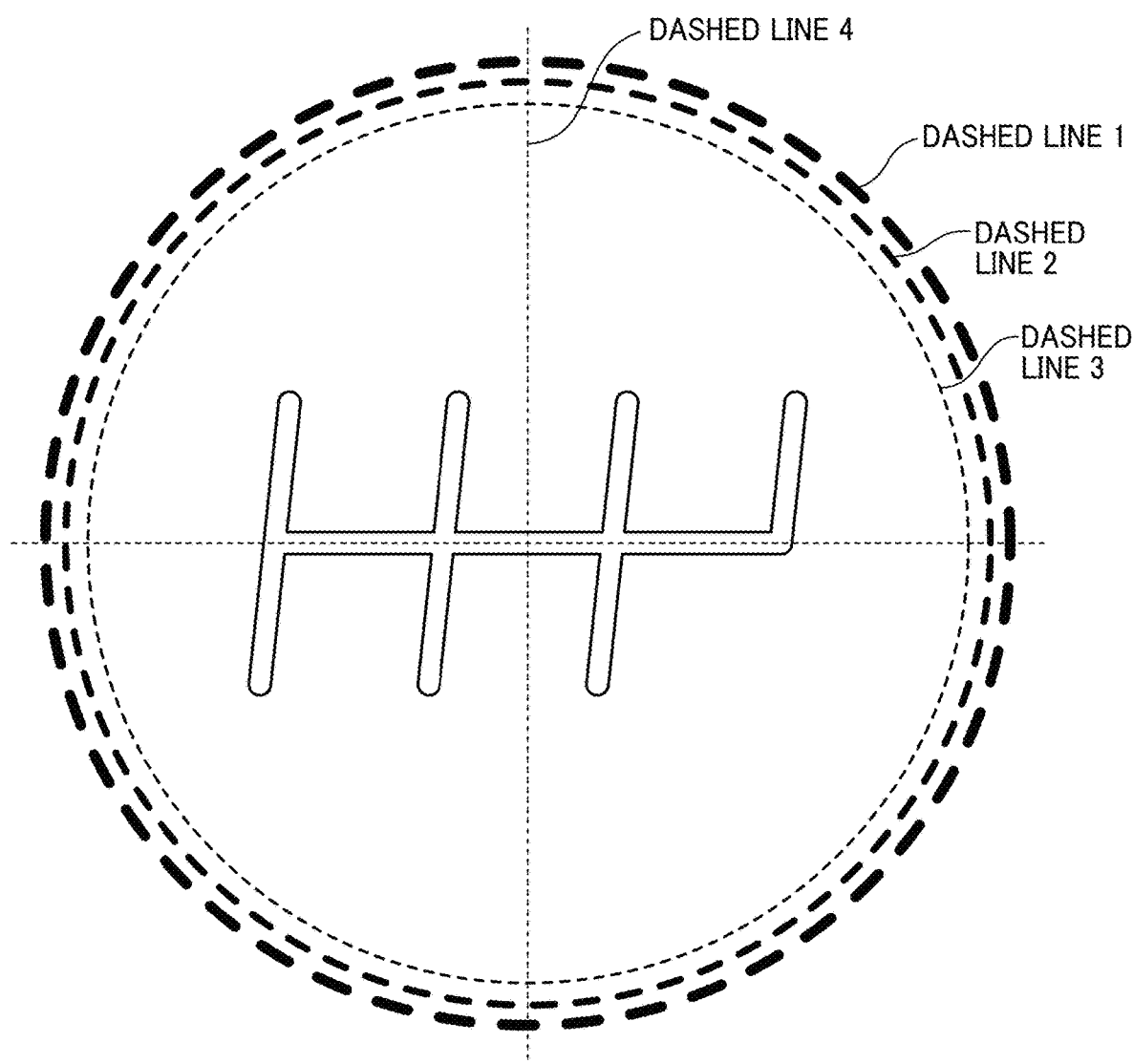
FIG. 22 is a diagram illustrating an example of checking a submitted design, according to a third embodiment of the present disclosure.

FIG. 22 is a diagram illustrating an example of checking a submitted design, according to the third embodiment. The inspection unit 208 notifies a state of a submitted design together with the inspection result of detecting the off-center. Such notification is given to inform that a picture larger than a printing guideline (range of print area), which is described below, is to be created, since the off-center is likely to occur when the size of the submitted design is the same as the printing guideline, or when the submitted design is smaller than the printing guideline (range of print area). Further, for example, when an amount of print deviation is predictable in advance, a designer or the inspector may be notified when the submitted design is smaller than the range of the print area plus the amount of deviation.

As illustrated in FIG. 22, the inspection unit 208 displays, on the display 506, the printing guideline (Dashed line 1 indicating the outer shape of the inspection target object 300, Dashed line 2 indicating a position where the positional deviation is zero, and Dashed line 3 indicating the outer circumference (edge) of the picture of the inspection target object 300), as being superimposed on the outer circumference (edge) of the picture of the inspection target object 300, which is information detected from the master image. The inspection unit 208 further displays Dashed line 4 indicating the center of the outer shape of the inspection target object 300, which is information detected from the master image, on the display 506.

The printing guideline (range of print area) indicates an outer circumference of the print area. Therefore, when the outer circumference (edge) of the picture of the inspection target object 300 detected from the master image matches the printing guideline (range of print area), or smaller than the printing guideline (range of print area), the inspector recognizes that the design of the inspection target object 300 is small and inappropriate.

The printing guideline (the center of the print area) indicates the center of the print area. Therefore, when the center of the picture of the inspection target object 300 detected from the master image is deviated from the printing guideline (center of the print area), the inspector recognizes that the picture of the inspection target object 300 is deviated and inappropriate. Further, even in a case in which the design is originally deviated from the center, presenting the center of the print area enables the inspector to correctly determine that the picture of the inspection target object 300 is deviated and inappropriate, or that the picture of the inspection target object 300 is appropriate, without being affected by the deviation of the design.

Thus, according to the present embodiment, by displaying the master image (reference data) as being superimposed on the printing guideline, issues to be addressed with respect to the master image (reference data) such as the print area is small and inappropriate, or the center of the print area is deviated, are presented so that the inspector or the designer recognizes such issues without difficulty.

When the print quality is inspected by the conventional visual inspection by an inspector as described in the description of the related art, variations and inspection errors are likely to occur depending on the inspector. In particular, when printing a pattern (picture) having the same shape as the inspection target object on the inspection target object, the inspector reacts sensitively even when the position of the pattern (picture) is slightly deviated. Accordingly, the judgment as to whether a product is a non-defective product or a defective product is likely to vary. This puts heavy burden on the inspector.

According to one or more embodiments of the present disclosure, burden on an inspector is reduced and inspection is carried out efficiently.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

The apparatuses or devices described in one or more embodiments are just one example of plural computing environments that implement the one or more embodiments disclosed herein. In some embodiments, the information processing apparatus 200 includes multiple computing devices, such as a server cluster. The multiple computing devices are configured to communicate with one another through any type of communication link, including a network, a shared memory, etc., and perform the processes disclosed herein. In substantially the same manner, for example, the information processing apparatus 200 includes such multiple computing devices configured to communicate with one another.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

What is claimed is:

1. An inspection system comprising circuitry configured to:
   determine whether a predetermined pattern is present in a master image of an inspection target object, wherein a design image is printed on the inspection target object, and the inspection target object has a center;
   acquire an inspection target image of the inspection target object from an image captured by an image capturing device;
   inspect the inspection target object by comparing the master image of the inspection target object with the inspection target image and determining an off-center deviation of the inspection target image; and
   switch a threshold value used in comparing the master image with the inspection target image of the inspection target object depending on a determination result of determining whether the predetermined pattern is present in the master image of the inspection target object, and a type of the predetermined pattern, the threshold value relating to a strictness of a quality evaluation threshold.

2. The inspection system of claim 1, wherein
   the predetermined pattern is a pattern similar to a shape of the inspection target object.

3. The inspection system of claim 1, wherein
   the predetermined pattern is a pattern similar to any one of point symmetry and line symmetry.

4. The inspection system of claim 1, wherein
   the master image of the inspection target object is print data.

5. The inspection system of claim 1, wherein
   the circuitry determines that the inspection target image is defective when a result of comparison between the master image of the inspection target object and the inspection target image does not satisfy the threshold value.

6. The inspection system of claim 1, wherein
   the circuitry displays information detected from the master image of the inspection target object and information obtained from a result of comparison between the master image of the inspection target object and the inspection target image, as being superimposed on each other.

7. The inspection system of claim 1, wherein
   the circuitry displays information detected from the master image of the inspection target object and a printing guideline, as being superimposed on each other.

8. An information processing apparatus comprising circuitry configured to:
   determine whether a predetermined pattern is present in a master image of an inspection target object;
   print a design image on the inspection target object, the inspection target object having a center;
   acquire an inspection target image of the inspection target object from an image captured by an image capturing device;
   inspect the inspection target object by comparing the master image of the inspection target object with the inspection target image and determining an off-center deviation of the inspection target image; and
   switch a threshold value used in comparing the master image with the inspection target image of the inspection target object depending on a determination result of determining whether the predetermined pattern is present in the master image of the inspection target object and a type of the predetermined pattern, the threshold value relating to a strictness of a quality evaluation threshold.

9. The information processing apparatus of claim 8, wherein
   the predetermined pattern is a pattern similar to a shape of the inspection target object.

10. The information processing apparatus of claim 8, wherein
    the predetermined pattern is a pattern similar to any one of point symmetry and line symmetry.

11. The information processing apparatus of claim 8, wherein
    the master image of the inspection target object is print data.

12. The information processing apparatus of claim 8, wherein
    the circuitry determines that the inspection target image is defective when a result of comparison between the master image of the inspection target object and the inspection target image does not satisfy the threshold value.

13. The information processing apparatus of claim 8, wherein the circuitry displays information detected from the master image of the inspection target object and information obtained from a result of comparison between the master image of the inspection target object and the inspection target image, as being superimposed on each other.

14. The information processing apparatus of claim 8, wherein the circuitry displays information detected from the master image of the inspection target object and a printing guideline, as being superimposed on each other.

15. A non-transitory computer-readable medium storing a program storing instructions which, when executed by a computer, causes the computer to execute a method comprising:

determining whether a predetermined pattern is present in a master image of an inspection target object;

printing a design image on the inspection target object, the inspection target object having a center acquiring an inspection target image of the inspection target object from an image captured by an image capturing device;

inspecting the inspection target object by comparing the master image of the inspection target object with the inspection target image and determining an off-center deviation of the inspection target image; and switching a threshold value used in comparing the master image with the inspection target image of the inspection target object depending on a determination result of determining whether the predetermined pattern is present in the master image of the inspection target object and a type of the predetermined pattern, the threshold value relating to a strictness of a quality evaluation threshold.

16. The inspection system comprising circuitry of claim 1, wherein the threshold value is switched by multiplying a normal threshold value with a coefficient based on the predetermined pattern, the coefficient being a ratio of a signal level of an edge face area to a signal level of a flat face area.

17. The inspection system of claim 1, wherein the comparing includes determining if the inspection target image is defective compared to the master image based on the threshold value.

18. The information processing apparatus of claim 8, wherein the comparing includes determining if the inspection target image is defective compared to the master image based on the threshold value.

19. The non-transitory computer-readable medium of claim 15, the comparing includes determining if the inspection target image is defective compared to the master image based on the threshold value.

20. The inspection system of claim 16, wherein the edge face area is an outer face of the inspection target object which is non-parallel to the flat face area, and the flat face area is a central, planar face of the inspection target object.

* * * * *